Patented Dec. 19, 1922.

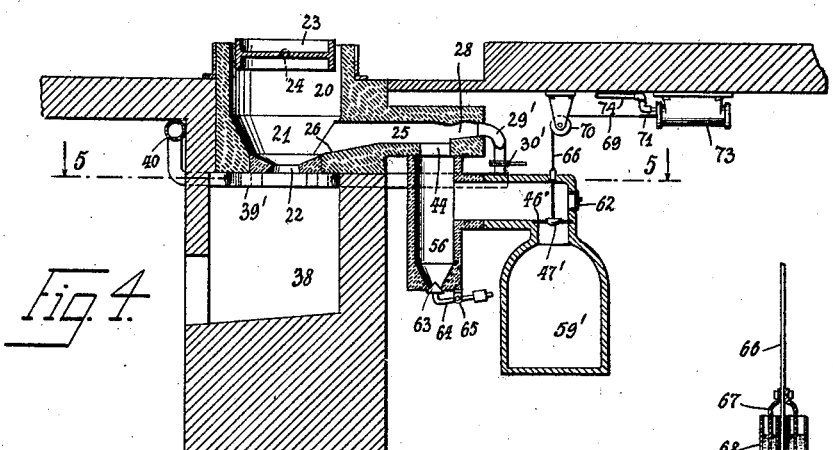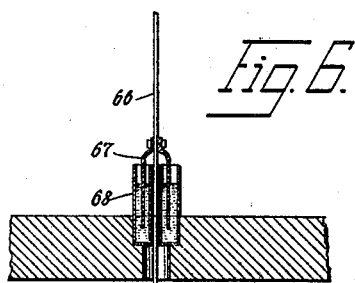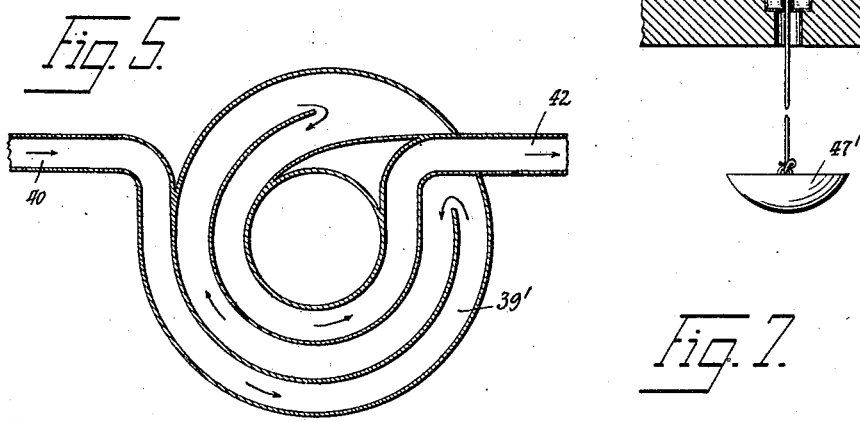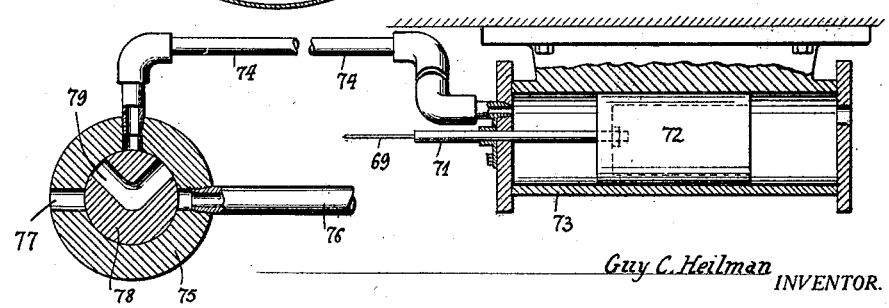

1,439,103

UNITED STATES PATENT OFFICE.

GUY C. HEILMAN, OF PHILADELPHIA, PENNSYLVANIA.

HEATING DEVICE FOR KILNS AND OTHER STRUCTURES.

Application filed December 17, 1920. Serial No. 431,470.

*To all whom it may concern:*

Be it known that I, GUY C. HEILMAN, a citizen of the United States, and a resident of Philadelphia, in the county of Philadelphia and State of Pennsylvania, have invented certain new and useful Improvements in Heating Devices for Kilns and Other Structures, of which the following is a specification.
My present invention relates to heating devices for kilns and other structures, and has for its object to provide an efficient and easily regulated device for this purpose.

Figure 1:
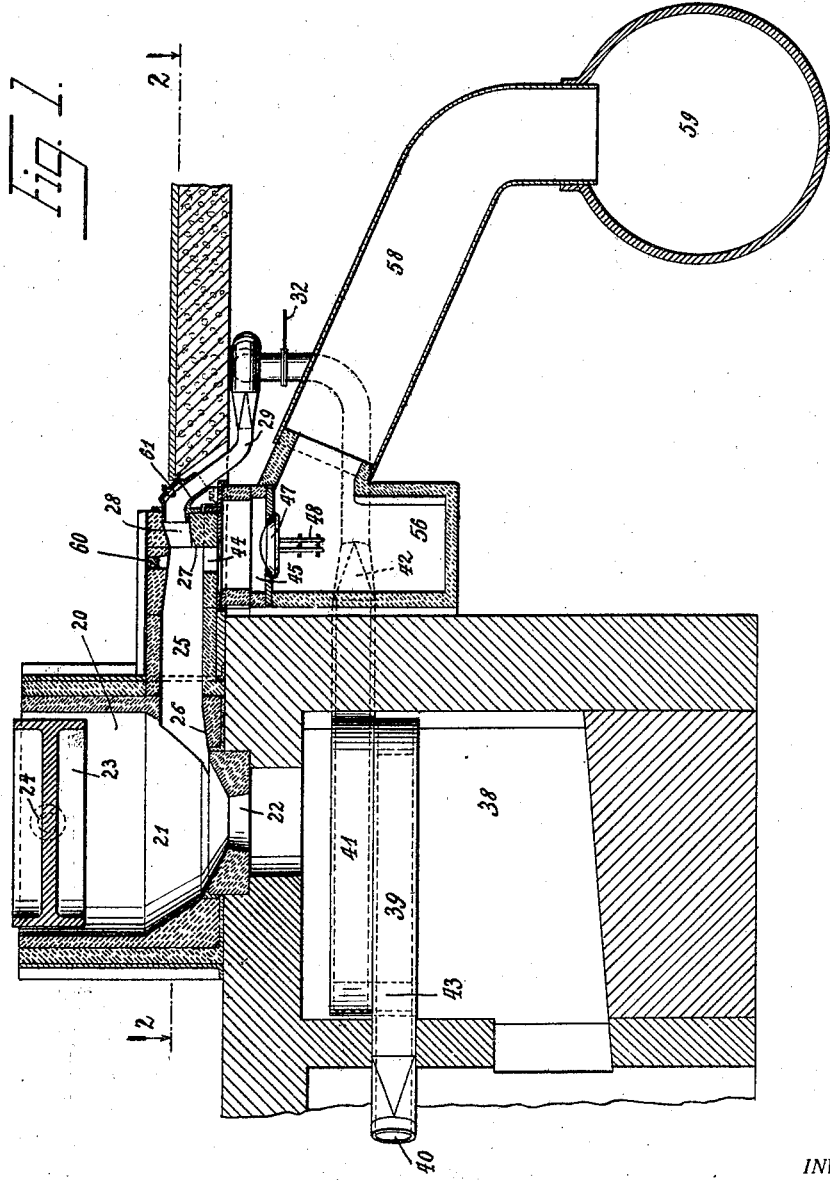
Figure 2:
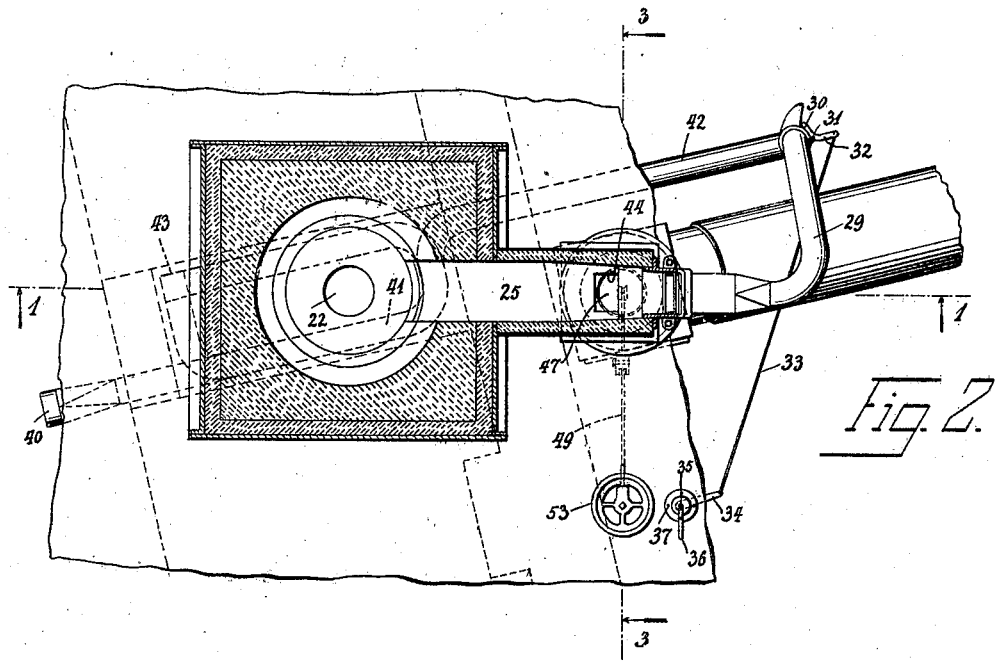
Figure 3:
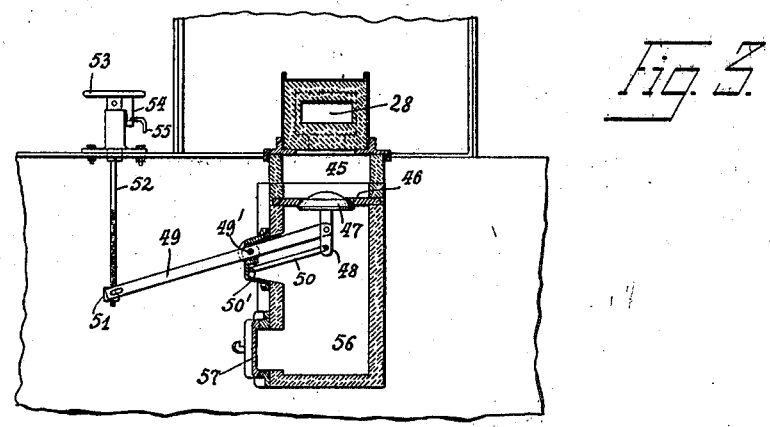

Two satisfactory embodiments of my invention are illustrated by the accompanying drawings, in which Fig. 1 is a vertical section on line 1—1 of Fig. 2, showing one form of my heating device; Fig. 2 is a top view with parts in section on line 2—2 of Fig. 1;
Fig. 3 is a vertical section on line 3—3 of Fig. 2; Fig. 4 is a vertical section corresponding to Fig. 1 and showing the second form of my invention; Fig. 5 is a horizontal section of the air-heating coil used in connection with said second form, in the plane indicated by the line 5—5 in Fig. 4; Fig. 6 is a detail vertical section of the gas valve and its sealing device; and Fig. 7 is a diagrammatic vertical section of the mechanism controlling the gas valve.

In the construction shown in Figs. 1, 2, and 3, 20 designates a heating chamber or well having a contracted lower portion 21 with a central opening 22 at the bottom. At a suitable distance above the bottom, I have shown an invertible double drawing pot 23, mounted to swing about a horizontal axis 24, this being an arrangement well-known in the glass-melting art. Between the bottom opening 22 and the part containing the pot 23, the side wall of the well 20 has an opening by which said well communicates with a combustion flue or combustion chamber 25 the outlet of which flares toward said well. This chamber 25 is substantially horizontal in the embodiment illustrated, its bottom wall being horizontal for the greater portion of its length, but inclined downwardly toward the outlet, as indicated at 26, said inclined bottom portion leading to the inclined surface at the lower portion 21 of the well 20. The width of the combustion flue 25 is shown uniform for a distance from the outlet, and then reduced gradually. The height of said flue also varies, its roof being shown horizontal for almost the same distance that its width is uniform, the roof then inclining downwardly, and then again upwardly. In the vertical plane where said inclined roof portions meet, there is a step 27 in the bottom of the combustion flue, and the contracted channel 28 above said step constitutes an air inlet the longitudinal axis of which has a slight downward inclination toward the flue 25, so that the axis of said air inlet is oblique and longitudinal with reference to the axis of the flue 25.

Air is supplied to the inlet 28 through a metal pipe 29 containing a suitable regulator, for instance a valve or gate 30 pivoted at 31 and provided with a crank 32 connected by a rod 33 with a crank 34 on a shaft 35. This shaft projects to a point convenient to the attendant (at the so-called pulpit), and is provided with a handle 36 adapted to be brought to and if desired, locked in, different positions, as indicated at 37. Heated air reaches said pipe 29 from an air-heater located in the chamber 38 disposed beneath the well 20 and communicating therewith by the opening 22. This heater consists of a double coil the lower portion of which, 39, has an inlet connection 40 receiving air from a blower or like device (not shown), while the upper coil portion 41 has an outlet connection 42 to the pipe 29. The air connection of the lower portion 39 of the coil with the upper portion 41 is at the point 43. It will be noted that the central free space surrounded by the heating coil is wider than the opening 22, and directly beneath it (see Fig. 2), so that the glass dropping through said opening 22 will not strike the heating coil.

Adjacent to the step 27, a gas-supply opening 44 is provided in the bottom of the combustion flue 25, said opening being preferably narrower than said flue, and establishing communication between said flue and an intermediate gas chamber 45 located under a portion of the flue 25. The bottom 46 of the chamber 45 is provided with an opening controlled by a gas valve 47. As illustrated, this valve is located below the opening in the bottom wall 46, and has a downwardly-extending stem 48 having pivotal connections with arms 49 and 50, fulcrumed at 49' and 50' respectively about axes which are parallel to those of the pivotal connections of the stem 48. The length between the fulcrum and the pivotal connection with the stem 48 is the same for each of the rods 49, 50, so as to impart a parallel motion to the valve, the valve axis always remaining vertical, and the valve horizontal, so that it will seat and open evenly all around. The outer end of the arm or rod 50 has a pin-and-slot connection with a nut 51, in engagement with the threaded lower portion of a rod or shaft 52, journaled in suitable bearings, but held against longitudinal movement. At the so-called pulpit, adjacent to the air-regulating handle 36, the shaft 52 is provided with a handwheel 53 for convenient operation by the attendant. This handwheel is shown as provided with a projection or bracket 54 carrying a screw 55 which may be forced against a stationary part, as the shaft bearing, to lock the shaft 52 after adjustment. The valve 47 and its stem 48 are located and move in a chamber 56, provided with a lateral opening normally closed by a door 57, facility being thus afforded for cleaning out the chamber 56. Gas is supplied to the chamber 56 through a conduit 58 from a main 59.

In the roof of the combustion flue 25, directly above the gas-supply opening 44, is located another opening normally closed by a removable plug or cover 60, and upon removing this cover ready access is obtained to the opening 44 as well as to the valve 47 and its seat, so that these parts may be cleaned by inserting a rod or brush through the opening normally closed by the plug or cover 60.

In order that the combustion within the flue 25 may be watched and thus more readily regulated, I prefer to provide a peep-hole covered with mica or other suitable transparent material, at the upper portion of the air-pipe 29, as indicated at 61, that is to say, at a point where the attendant may look through such peep-hole conveniently, along the axis of the air-inlet 28, and observe the action at the point where the air entering through 28 meets the gas entering through the opening 44, it being understood that combustion begins at the point where the current of gas meets the current of heated air.

The air is thoroughly preheated in the coil 39, 41, and both the air and gas may be regulated independently by means of the handle 36 and handwheel 53 respectively. The air inlet 28 is contracted toward its outlet, and thus delivers the air in a strong, concentrated jet. The portion of the flue 25 between the opening 44 and the outlet to the well 20 first flares immediately adjacent to said opening 44, so as to allow a certain degree of expansion, then for a certain distance the cross section of the flue 25 is uniform, and finally, as the outlet to the well is approached, the flue flares again toward the outlet, at the portion where the bottom of the flue is inclined, as at 26. This final flare of the combustion flue is of considerable importance in securing a proper heating action within the well 20, 21. The fact that the inclined bottom 26 of the flue 25 slopes toward the outlet 22 of the well, and toward the inclined wall 21 adjacent to said outlet, is also of importance in that it prevents clogging of the flue by any glass which may drop into the outlet of the flue 25 at the time of discharging glass from the pot 23.

In the construction illustrated by Figs. 4 to 7, the arrangement of the well 20, 21 with its outlet 22 and of the combustion flue 25, 26 is substantially the same as in the first form of my invention, but it will be noted that the inclined bottom portion 26 of the flue 25 is continued to the inclined surface at the bottom of the well, thereby avoiding the slight horizontal ledge which is shown in Fig. 1, and by the continuous inclination of the portion 26 and the adjacent well bottom facilitating the draining of any glass that may reach the outlet portion of said combustion flue. Other features in which the second form of my invention differs from the first, are as follows: The air-heating coil, instead of comprising two superposed sections, has all of its convolutions located in the same plane, as indicated at 39', thereby reducing the height of the air-heater. The pipe 29' and its regulating valve 30' are located in a manner slightly different from the correspondingly numbered parts of Figs. 1 and 2, and as they are not accessible from above owing to an interposed floor, as shown, the plug 60 is not used in this construction, neither have I shown a peep-hole such as 61; the latter might indeed be provided at the same point as in Fig. 1, but the attendant in that case would have to go down to the lower floor to view the combustion through such peep-hole. The gas-supply opening 44 opens directly into the chamber 56, without any intermediate chamber such as 45. Instead of the opening and door 57, an opening and door 62 are provided, and the wall 46 having a seat for the gas valve 47', is located adjacent to said door 62, so that the valve seat may be readily reached and cleaned through said opening. It will be noted that the valve 47' seats downwardly instead of upwardly as in the first form of my invention. In order that the opening 44 may be cleaned when required, the chamber 56 is made with a bottom opening normally closed by a valve or cap 63 carried upwardly by a weighted lever 64 fulcrumed at 65. The gas-valve 47' is secured to a rod 66 passing through a suitable opening in the roof of the gas channel 59' which connects the flue 59' with the chamber 56, and in order to obtain a gas-tight joint, a bell 67 secured to said rod 66, may dip into a body of liquid contained in an annular trough 68 secured to the outside of said channel. To the rod 66 is attached a wire or other flexible connection 69, guided by a pulley 70 and having its upper end secured to a rod 71 fastened to a piston 72 movable in a cylinder 73. The position of the piston, and therefore of the valve 47′, may be adjusted by admitting a fluid under pressure (say, air or water) between the piston 72 and the head of the cylinder 73. For this purpose, I have shown a pipe 74 which conveys such fluid under pressure from a valve 75 which receives said fluid from a supply-pipe 76. The valve housing 75 has two ports connected with the pipes 74 and 76 respectively, and a third port 77 connected with the surrounding atmosphere. The plug 78 of the valve may be turned by means of a suitable handle (not shown), and it will be understood that the valve and its operating handle are suitably located for convenient operation, generally at the "pulpit." The plug 78 has an angular passage 79 so arranged that in one position it will connect the pipes 74 and 76 to admit air or water under pressure to the cylinder 73, to adjust the valve 47′ by leaving the plug 78 in such position until the proper opening of the valve 47′ has been obtained, whereupon by turning the plug 78 to the closing position (illustrated by Fig. 7), the piston 72 and valve 47′ will be caused to remain in their adjusted position. When it is desired to close the valve 47′ partly or entirely, the plug 78 will be turned to the position in which its passage 79 connects the pipe 74 with the atmosphere through the port 77, and the plug is again turned to the closing position shown, in case it is desired to hold the valve 47′ in a partly closed position; but if the valve 47′ is to be closed entirely, and to remain closed, the plug 78 will be left in the position in which its passage 79 connects the interior of the cylinder 73 with the atmosphere.

The particular form of air-heater shown in Figs. 4 and 5 is not only very compact, but highly efficient, being formed with a spiral path in adjacent convolutions of which the air travels in opposite directions. The cross section of the said path or air-heating channel may be square, or of any other suitable shape.

It will be understood that the weight of the valve 47′ and of the rod 66 with the bell 67, is sufficient to cause these parts to overcome the resistance of the piston 72 when the interior of the pressure chamber of the cylinder 73 is connected with the outside air by a proper manipulation of the valve plug 78 as described above.

Various modifications may be made without departing from the nature of my invention as set forth in the appended claims.

I claim as my invention:

1. A heating device comprising a combustion flue having at one end an air-inlet contracted toward the opposite end, and a fuel inlet between the contracted discharge end of said air inlet and the outlet of the flue, the cross section of the flue first increasing between said fuel inlet and the outlet, then being uniform for a certain distance, and then again increasing toward said outlet.

2. A heating device comprising a combustion flue having at one end an air-inlet directed toward the opposite end, and an upwardly-directed fuel inlet at the lower portion of said flue, between the discharge end of said air-inlet and the outlet of the flue, the cross section of the flue at its outlet being greater than at the fuel inlet.

3. A heating device comprising a combustion flue provided in its bottom and adjacent to one end with an upwardly-directed inlet for the admission of fuel, an air-inlet arranged to discharge into the upper portion of the flue lengthwise adjacent to said fuel inlet on the side of the fuel inlet opposite to the outlet of the flue so as to blow air over and across such fuel inlet, the cross section of the flue at its outlet being greater than at said fuel inlet.

4. A heating device comprising a combustion flue having a step at one end and provided with a fuel inlet at the lower level of said step and with an air-inlet at the upper level of said step, the cross section of said flue being greater at its outlet than at its inlets.

5. In combination with a well having a bottom opening and a side opening, an air-heater located below said well and having an opening in registry with the bottom opening of the well, and a combustion flue discharging into the side opening of the well and receiving air from said air-heater.

6. In combination with a well having a bottom opening and a side opening, an air-heater located below said well and apertured for the free passage of any material that may drop through said bottom opening, a combustion flue discharging into the side opening of the well and receiving air from said air-heater, said flue also having a fuel inlet, and separate means for regulating individually the supply of air and of fuel to said flue.

In testimony whereof I have signed this specification.

GUY C. HEILMAN.